United States Patent [19]

Dunckel

[11] Patent Number: 5,427,016

[45] Date of Patent: Jun. 27, 1995

[54] EGG COOKING AND PACKAGING APPARATUS

[76] Inventor: Louis D. Dunckel, R.D. #2, Dunckel Rd., Oxford, N.Y. 13830

[21] Appl. No.: 186,031

[22] Filed: Jan. 25, 1994

Related U.S. Application Data

[60] Division of Ser. No. 841,271, Feb. 26, 1992, Pat. No. 5,281,431, which is a continuation of Ser. No. 419,273, Oct. 10, 1989, abandoned.

[51] Int. Cl.$^6$ ............................ A23L 1/32; A23L 3/18
[52] U.S. Cl. ........................................ 99/355; 99/423; 99/443 C; 99/568; 99/470
[58] Field of Search ............... 99/326, 334, 355, 352, 99/443 C, 568, 370, 367, 356, 470; 425/614, 523, 510, 399

[56] References Cited

U.S. PATENT DOCUMENTS

| | | | |
|---|---|---|---|
| 2,677,248 | 5/1954 | Rexford et al. | 99/367 |
| 3,597,228 | 8/1971 | Jeppson et al. | 99/355 |
| 3,958,035 | 5/1976 | Sterns | 99/353 |
| 3,972,153 | 8/1976 | Kiellarson et al. | 426/399 |
| 4,068,570 | 1/1978 | Lanoie | 99/355 |
| 4,136,608 | 1/1979 | Gladd et al. | 99/443 C |
| 4,228,193 | 10/1980 | Schindler et al. | 426/233 |
| 4,512,250 | 4/1985 | Schindler et al. | 426/614 |
| 4,533,515 | 8/1985 | Witter et al. | 426/399 |
| 4,560,567 | 12/1985 | Ravsing | 426/399 |
| 4,644,857 | 2/1987 | Buller-Colthurst | 99/443 C |
| 4,701,340 | 10/1987 | Bratton et al. | 426/523 |
| 4,784,053 | 11/1988 | Barnhart | 99/443 C |
| 4,862,790 | 9/1989 | Platteschorre et al. | 99/440 |
| 4,887,524 | 12/1989 | Ellis-Brown | 99/443 C |
| 4,957,760 | 9/1990 | Swartzel et al. | 426/399 |
| 5,066,505 | 11/1991 | Vos et al. | 426/523 |

FOREIGN PATENT DOCUMENTS

| | | | |
|---|---|---|---|
| 2498897 | 8/1982 | France | 426/614 |
| 63-164866 | 7/1988 | Japan . | |
| 1422823 | 1/1976 | United Kingdom | 426/614 |

Primary Examiner—David A. Scherbel
Assistant Examiner—Tony G. Soohoo
Attorney, Agent, or Firm—Jones, Tullar & Cooper

[57] ABSTRACT

An egg cooking and packaging process and apparatus are disclosed in which whole eggs are deshelled and transferred intact to cooking pans without breaking the yolks or separating the yolks from the whites. Additional egg white is preferably dispensed into the pans before the whole eggs are received therein to act as a cushion for the yolks and provide a low cholesterol mixture of yolks and egg whites. The eggs are cooked with dry culinary steam in a multiple temperature zone steam tunnel that slowly increases temperature from zone to zone to prevent toughening and yolk darkening. As the cooked eggs exit the steam tunnel they are dumped into a dicer and transported to form and fill packaging equipment which packages and seals the eggs while they are still at a sterile temperature. The sealed packages are cooled to a refrigerated temperature with sprayed ice water, and this creates a partial vacuum in the packages which prolongs their shelf life. Scrambled eggs can also be cooked and packaged in a similar manner.

17 Claims, 4 Drawing Sheets

EGG COOKING AND PACKAGING APPARATUS

This is a divisional of application Ser. No. 07/841,271, filed on Feb. 26, 1992, now U.S. Pat. No. 5,281,431, which is a continuation of Ser. No. 07/419,273, filed Oct. 10, 1989, now abandoned.

BACKGROUND OF THE INVENTION

The present invention relates to an automated process and apparatus for cooking and packaging eggs.

Cafeterias in public institutions such as schools, prisons and hospitals, have a large demand for prepared eggs. Eggs supplied in mass quantities are typically in one of three forms: fresh, precooked or frozen. Fresh eggs are the most desirable from a taste and quality standpoint, however, they must be prepared, which takes time and skilled personnel, and exposes consumers to health risks, such as food poisoning or salmonella. This risk has resulted in the passage of government regulations in some jurisdictions which require that eggs served by these institutions must be either precooked or frozen prior to delivery to the institutions.

Up to now, frozen or precooked eggs have been noticeably inferior in taste, quality or texture to fresh cooked eggs. In addition, the preparation of these eggs has placed significant burdens on the supplier. For example, if an institution desires a quantity of whole cooked eggs for salad bars, egg salad, etc., the eggs typically are cooked in their shells until they are hard boiled, and the shells are peeled. The shell peeling process is time consuming and impedes the supplier's ability to provide mass quantities. In addition, steps must be taken once the eggs have been peeled to insure that they are packaged in a sanitary and sterile environment.

SUMMARY OF THE INVENTION

It is therefore the object of the present invention to provide an automated mass production process and apparatus for cooking and packaging eggs which is time efficient and results in a product that is superior in taste, quality, texture and shelf life to that of precooked eggs prepared by previously known techniques.

It is another object of the invention to provide an egg cooking and packaging process and apparatus which provides different types of cooked eggs including chopped, scrambled and low cholesterol varieties.

These, and other, objects of the invention are achieved through use of a process and associated apparatus in which, fresh eggs are deshelled without separating the yolks from the whites, cooked whole with dry culinary steam, chopped, packaged while still hot from the cooking process, cooled to a refrigeration temperature and finally boxed for delivery. Unlike in previous egg cooking processes, the whole eggs are deshelled before they are cooked. The present invention makes use of a conventional egg breaking machine which carefully breaks the eggs and holds the whole eggs in individual cups. The deshelled whole eggs are then directed gently down a chute into a reservoir. From the reservoir, the eggs are dispensed through a pair of nondestructive valve mechanisms into a plurality of large cooking pans that pass beneath the reservoir on a conveyor. The filled pans are conveyed through a long multiple temperature zone steam cooking tunnel which carefully cooks the eggs with gradually increasing temperatures using dry culinary steam. As the pans exit the cooking tunnel, the cooked eggs are dumped into a dicing machine and chopped. A bucket conveyor directs the chopped eggs to a conventional vertical form, fill and seal packaging machine. As the eggs arrive at the packaging machine they are still at a sterile temperature so that the packages are sterilized as the eggs are deposited and sealed therein. The packaged eggs are next directed to a cooling tunnel where they are sprayed with ice water until they are cooled to a refrigerated, but not frozen, temperature. The cooled packages are then conveyed through a cold air blow dryer to remove the moisture from the cooling tunnel and finally to a packaging area where they are boxed for shipping.

In a preferred embodiment of the invention, low cholesterol eggs are made by adding additional egg white to the cooking pans before they are loaded from the egg reservoir. This extra egg white provides the additional benefit of acting as a cushion for the whole eggs as they are deposited from the reservoir into the pans. In yet another embodiment of the invention, chopped scrambled eggs can be made by first directing the whole eggs to a mixer and then to the cooking pans. Additional egg white may also be added to the blended mixture for low cholesterol scrambled eggs.

BRIEF DESCRIPTION OF THE DRAWINGS

The foregoing and additional objects, features and advantages of the present invention will become apparent to those of skill in the art from the following more detail consideration thereof, taken in conjunction with the accompanying drawings in which.

DETAILED DESCRIPTION OF THE PREFERRED EMBODIMENT

Figure 1:
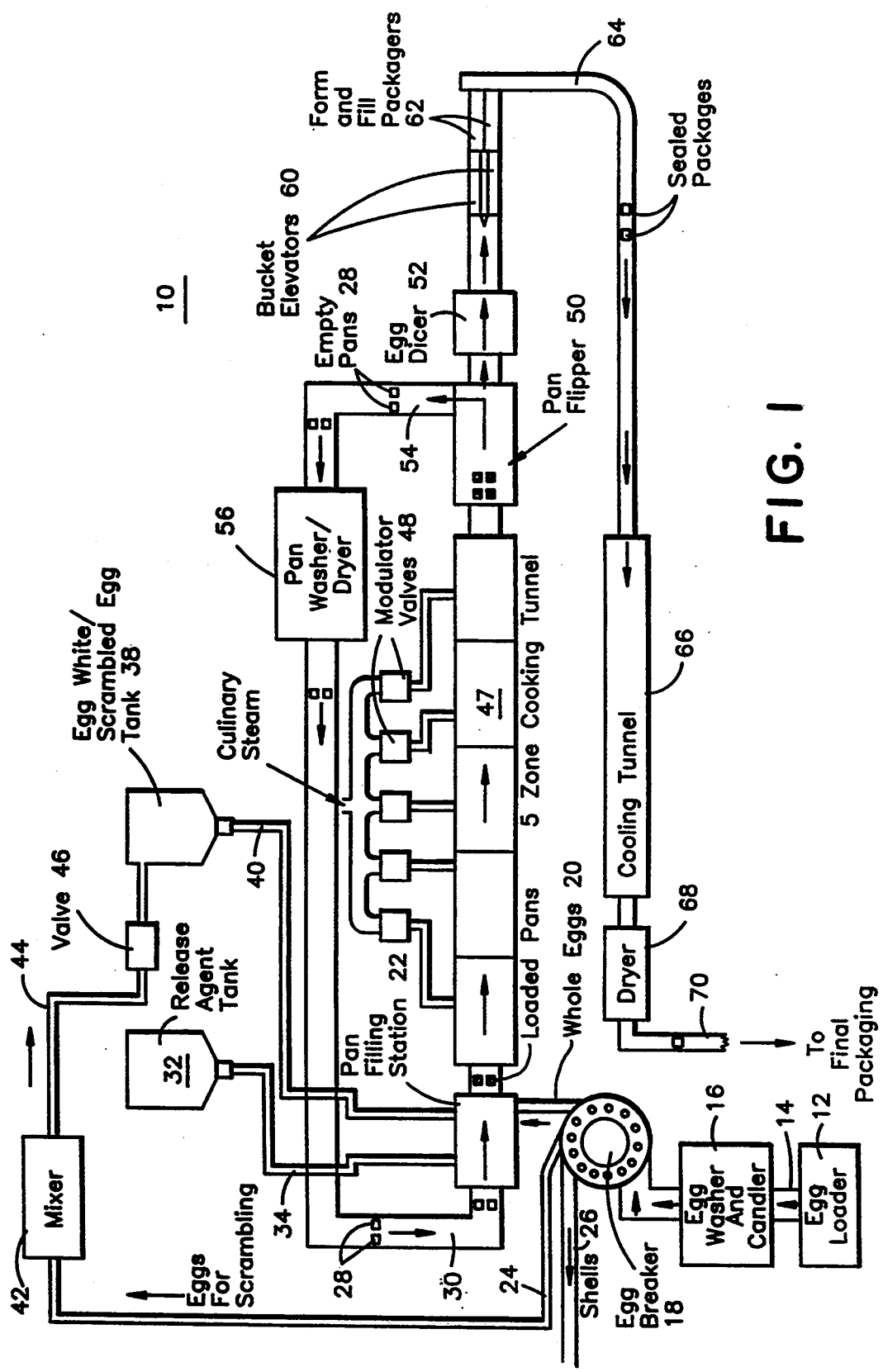
FIG. 1 is a schematic diagram of the various elements that form the egg cooking and packaging apparatus of the present invention.
Figure 2:
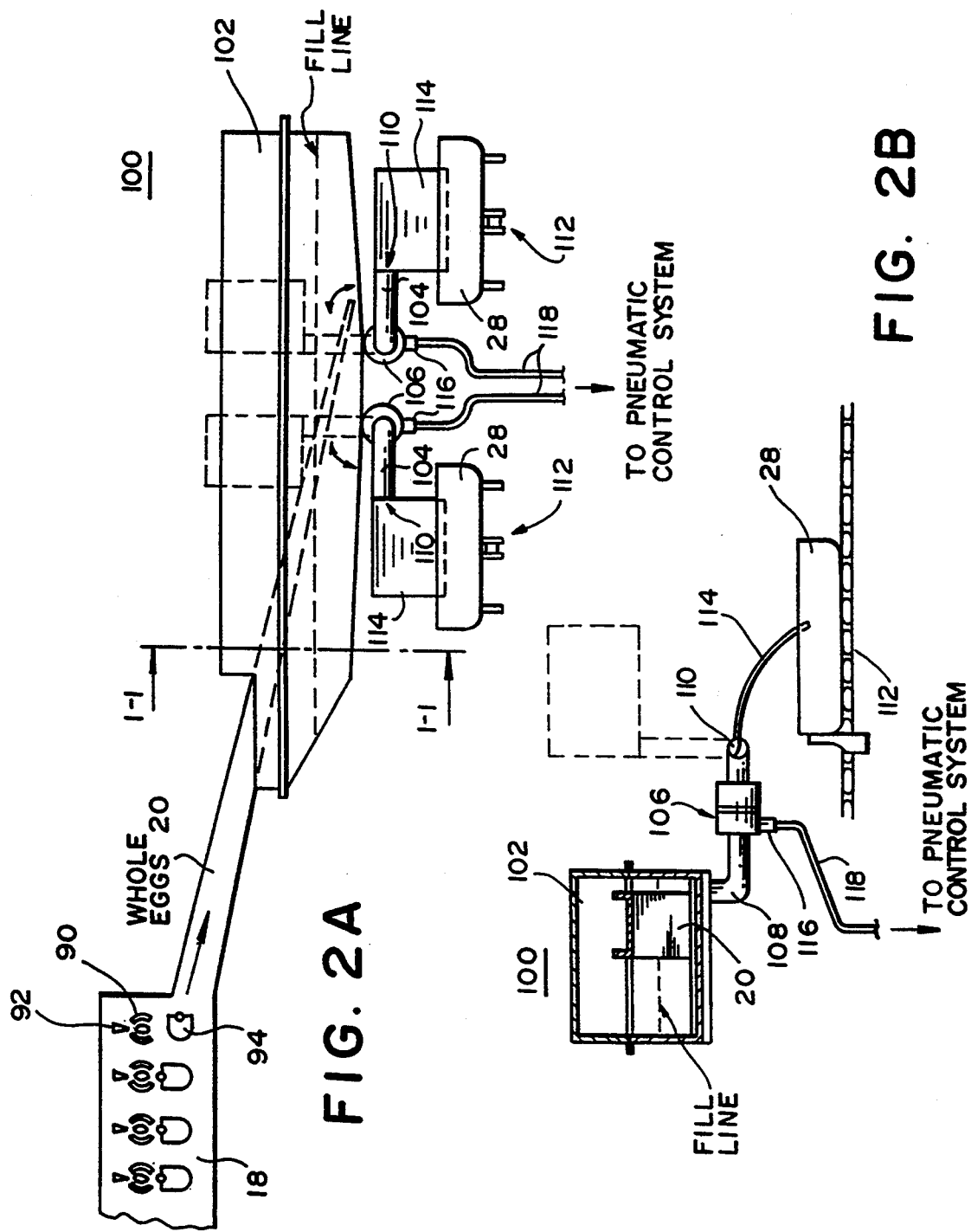
FIGS. 2A and 2B are diagrammatic front and side views, respectively, of a portion of the pan filling station that forms a part of the present invention.

Turning now to a more detailed consideration of the present invention, there is illustrated in FIG. 1, an egg cooking and packaging system 10 which includes a conventional egg loader 12 that unloads crated eggs and places them on a first conveyor section 14. The eggs are conveyed through a conventional egg washer and candler section 16 where the eggs are washed and inspected. They are then directed to an automatic egg breaker machine 18 of a conventional design, such as a Sanovo Model 3000. The egg breaker 18 will be discussed in greater detail in conjunction with FIG. 2 and acts to break and remove the shells without breaking the yolks. These deshelled intact whole eggs are directed down a chute 20 to a reservoir in a pan filling station 22 which will also be discussed in greater detail with reference to FIG. 2. If any of the eggs passing through the egg breaker 18 have broken yolks, an operator can manually actuate a lever (not shown) to cause egg breaker 18 to divert the broken yolk egg down a second chute 24. All of the broken egg shells are diverted from the egg breaker 18 via a third chute 26 to be discarded.

A train of parallel pairs of empty cooking pans 28 are directed along a conveyor section 30 to the pan filling station 22. At the filling station 22, a release or non-stick agent is fed from a tank 32 through a line 34 and is dispensed onto the inner surfaces of each pan. Then, a predetermined quantity of egg white from an egg white/scrambled egg tank 38 is fed through a line 40 to partially fill the pans 28. This will provide an egg mixture having a higher egg white to yolk ratio which decreases the cholesterol content per serving. The egg white in the bottom of the pans also acts as a cushioning means to help insure that the yolks of the whole eggs will not be broken as the whole eggs from the egg breaker 18 are deposited into the pans on top of the egg whites. If desired, the additional egg whites are not employed so that conventional cooked eggs will be obtained. In yet another alternative mode of operation, scrambled eggs may be formed by causing egg breaker 18 to divert all of the eggs through line 24 to a mixer 42, a line 44 and a valve 46 to the egg white/scrambled egg tank 38, and then back to the pan filling station 22.

The loaded egg pans 28 are then conveyed into a multiple temperature zone cooking tunnel 47, which is preferably a belt type steam chamber such as those manufactured by A. K. Robins and Co., Inc. Usually these types of steam tunnels employ conventional wet steam, however, in the present invention, dry culinary steam is supplied to the tunnel 47. If conventional wet steam was used, excessive amounts of moisture would be present in the cooked eggs, and they would have an undesirable consistency. On the other hand, if conventional convection heating were employed, the eggs would be too dry. The use of dry culinary steam, which has much but not all of the moisture removed, provides cooked eggs of proper consistency and texture.

Preferably, the cooking tunnel 47 is approximately 100 feet long and its belt speed is adjusted so that each pan of eggs takes approximately 20 minutes to pass through. Of course it will be understood that the speed can be adjusted to vary the cooking time as desired. The multiple zone heating is necessary to insure that the eggs are cooked properly. In the first zone, for example, the eggs are exposed to a temperature of around 170°–180° F. This temperature is gradually increased from zone to zone so that in the final zone the temperature is approximately 210° F. The lower temperature at the start of the cooking cycle insures that the eggs are not cooked too quickly which would make them tough and discolor the yolks. The higher temperature at the end of the cooking tunnel 47 helps insure that the eggs will be elevated above a sterile temperature (e.g., 180° F.) and will remain at a sterile temperature until they are packaged approximately 1–2 minutes after they leave the cooking tunnel 47. To control the temperature in each of the zones, a plurality of modulator valves 48 are disposed, one between each of the zones and a source of culinary steam (not shown). Although five zones are illustrated in FIG. 1 for the cooking tunnel 47, it will be understood that any number of zones can be employed, although it is preferred that there are at least three.

From the cooking tunnel 47, the pans 28 are directed to a pan flipper device 50, which is described in more detail in conjunction with FIG. 4, and flips each of the pans over to dump the cooked eggs into an egg dicer 52. The emptied pans 28 are directed along a conveyor 54 to a pan washer and dryer 56 and back to the pan filling station 22 for another cooking cycle. The egg dicer 52 chops the cooked egg mixture into small chunks that, in the case of whole eggs, are suitable for use in egg salads or the like. In the case of scrambled eggs, the egg dicer 52 serves to blend the cooked eggs into scrambled eggs. It will be understood that different cutting knives can be employed by the dicer 52 to chop or blend the eggs as desired.

The chopped eggs are conveyed from the egg dicer 52 on a conveyer 58 to a pair of bucket elevators 60 which convey the eggs to the top of a pair of form and fill packagers 62, that can be of any conventional variety, such as the MARK Series from Universal Packaging, Inc. As the chopped eggs enter the packagers 62, they are still at a sterile temperature of at least 180° F. so that the eggs will sterilize the packaging (preferably made from polystyrene) as they are deposited therein. The packaging and sealing of the cooked eggs while they are still at this elevated temperature also seals in their flavor, and extends their shelf life.

The weighed and sealed egg packages are conveyed from packager 62 along a conveyor section 64 into a cooling tunnel 66 where the packages are sprayed with ice water for approximately one hour until their temperatures are reduced to a refrigerated temperature of approximately 40° F. From the cooling tunnel 66, the cooled packages are then passed through a cold air blow dryer 68, and finally to a conveyor 70 which directs the packages to a final packaging station where they are manually or automatically boxed for shipping. Since the packages are sealed when the eggs contained therein are still hot, the cooling process in cooling tunnel 66 acts to create a partial vacuum within the packages also helps to prolong the shelf life of the eggs.

Turning now to FIGS. 2A and 2B, there is illustrated a portion of the egg breaker 18 and the pan filling station 22. The egg breaker 18 is conventional and includes a plurality of egg holding elements 90, a plurality of corresponding egg shell breaking knives 92 and a plurality of corresponding whole egg receiving cups 94. As the egg breaker operates, the knives 92 break the shells, and the whole eggs are received in the cups 94. In the Sanovo Model 3000 rotary egg breaker, a manually selectable cup dumping mechanism (not shown) causes each of the cups 94 to dump their contents at the desired location, such as the chute 20 for whole eggs, or the chute 24 in FIG. 1 for eggs with broken yolks or eggs to be scrambled.

A whole egg pan filling mechanism 100 is also shown in FIG. 2A which includes a whole egg reservoir 102 that receives eggs from the egg breaker 18 through the chute 20. The chute 20 extends downward at an angle into the reservoir 102 and terminates near the bottom thereof so that eggs will slide gently into the reservoir 102 and the risk of yolk breakage is minimized. During normal operation, the reservoir 102 is filled with whole eggs up to a level indicated by the dashed fill line in FIGS. 2A and 2B. This level is controlled by a level sensing system to be discussed in detail in conjunction with FIG. 3 which acts to vary the speed of the egg breaker 18 as necessary to adjust the level in the reservoir 102.

A pair of dispensing tubes 104 are connected through a corresponding pair of rotary couplings 106 to a pair of fixed tubes 108, which in turn are connected to a pair of openings disposed in the bottom of the reservoir 102. The dispensing tubes 104 each have a discharge opening 110 for dispensing whole eggs into the egg pans 28 as they pass beneath the reservoir 102 on a pair of chain type conveyors 112. A pair of curved deflector plates 114 are attached to the dispensing tubes 104 adjacent the discharge openings 110 for guiding the eggs gently into the pans 28.

As indicated by the dashed lines in FIGS. 2A and 2B, the rotary couplings 106 enable the dispensing tubes 104 to be pivoted about a horizontal axis 90° so that the discharge openings 110 are pointed upwardly and are positioned at a level above that of the fill line in the reservoir 102. This prevents eggs from exiting the dispensing tubes 104 when the pans 28 are not yet in position beneath the reservoir 102, and provides the important advantage of not requiring any type of gate type shutoff valve for the dispensing tubes 104. Such a valve could break the yolks of eggs as they are dispensed and contaminate the entire batch of eggs in the pan 28. The rotary action of the couplings 106 can be carried out in any suitable manner, but preferably is accomplished pneumatically. In this case, the rotary couplings 106 are conventional pneumatically operated couplings and each have a connection 116 connected to a pneumatic line 118 that is connected to a pneumatic valve control system (illustrated in FIG. 3) for controlling the position of the discharge tubes 104.

Figure 3:
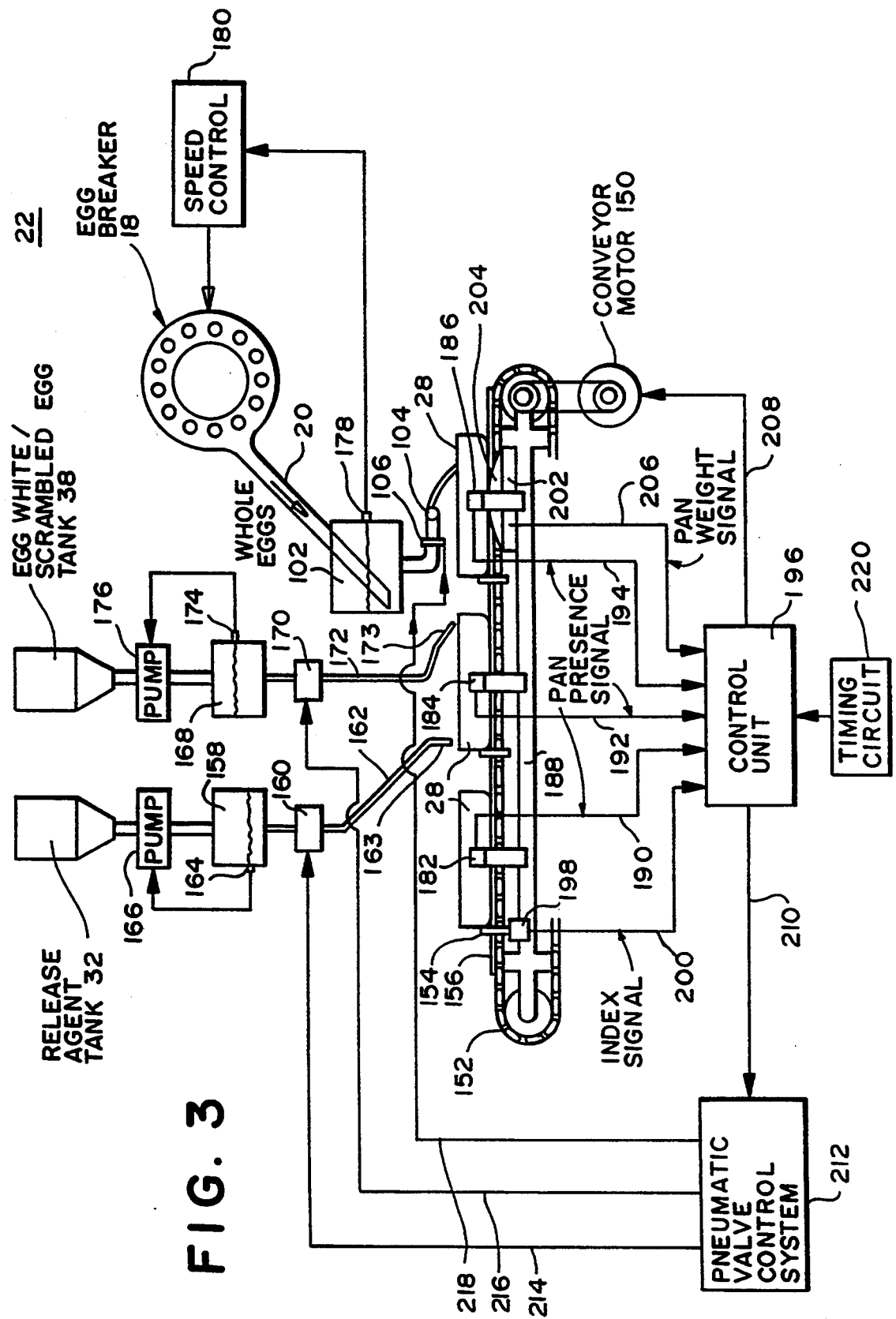
FIG. 3 is a schematic diagram of the pan filling station and its control electronics; and, FIGS. 4A and 4B are diagrammatic top and side views, respectively, of a pan flipper that forms a part of the present invention.

Turning now to FIG. 3, the pan filling station 22 is shown in greater detail. As illustrated, each of the pans 28 is conveyed along the chain type conveyor 112 by means of a conveyor motor 150. A chain 152 for conveyor 112 has a plurality of pan pusher elements 154 attached thereto which engage the pans 28 and push them along a conveyor rail 156.

The release agent tank 32 is connected to a release agent reservoir 158, which in turn is connected through a pneumatic control valve 160 to a release agent dispensing tube 162 having a tip 163 positioned above the conveyor 112. A release agent reservoir level sensor 164 provides a signal to a release agent pump 166 to maintain a constant level, and therefore head pressure, within the release agent reservoir 158. Similarly, the egg white/scrambled egg tank 38 is connected to an egg white reservoir 168, which in turn is connected through a pneumatic control valve 170 to an egg white dispensing tube 172. A tip 173 of the dispensing tube 172 is formed, sized and positioned such that egg white liquid dispensed therefrom impinges high on the interior sidewall of the egg pans 28 and flows into the pan cavities. An egg white reservoir level sensor 174 provides signals to an egg white pump 176 to maintain the level, and therefore head pressure, constant in the egg white reservoir 168. The whole egg reservoir 102 also includes a level sensor 178 which provides signals to a speed control 180 for the egg breaker 18 that adjusts the speed thereof as necessary to maintain the level of the eggs in the egg reservoir 102 substantially constant.

A plurality of infrared pan presence sensors 182, 184 and 186 are attached to a conveyor frame 188. The outputs from these sensors are fed via a plurality of lines 190, 192 and 194, respectively, to a microprocessor based control unit 196 for the pan filler system. An index sensor 198 is also positioned on the frame 188 for sensing the presence of each of the pan pusher elements 154. The output from the sensor 198 is fed via a line 200 to the control unit 196. A pan weigh scale 202 is disposed along the conveyor 112 beneath the dispensing tube 104 for the whole egg reservoir 102. A plurality of pan support blocks 204 are disposed on top of the scale 202 which act to lift the pans 28 off of the conveyor rail 156 so that their full weight will be placed on the weigh scale 202. The output from the scale 202 is fed through a line 206 to the control unit 196.

The control unit 196 provides two main outputs. A first output 208 provides control signals to the conveyor motor 150 and a second output 210 provides control signals to the pneumatic valve control system 212. In response to the control signals, the valve control system 212 selectively actuates the pneumatically actuated valves 160, 170 and 106, through a plurality of pneumatic lines 214, 216 and 218, respectively. A timing circuit 220 is connected to the control unit 196 to provide timing signals for the conveyor motor 150 and the valve control system 212.

The operation of the pan filler system will now be described. As one of the pans 28 enters the pan filling station 22, its corresponding pusher element 154 will pass the index sensor 198. This will send a signal to the control unit 196 which will cause the conveyor motor 150 to stop. After a time period determined by the timing circuit 220, the conveyor motor 150 will once again start and advance the pan 28. As the trailing edge of the pan 28 passes by the first pan presence sensor 182, a signal will be sent from the control unit 196 to the valve control system 212 to cause the release agent valve 160 to open and begin coating the interior of the pan 28 with the release agent. This continues until the next pan pusher element 154 for the next pan 28 passes the index sensor 198, at which time the release agent valve 160 is closed, and the conveyor motor 150 is stopped for another timed cycle.

The generation of the pusher element's sensing signal by the index sensor 198 and a pan presence signal from the second pan sensor 184 causes the egg white valve 170 to be opened so that egg white is now dispensed into the pan 28. The timing circuit 220 provides an adjustable time period during which the egg white dispensing valve 170 is opened so that a predetermined quantity of egg white is dispensed into the pan 28. This quantity is selected to provide a desired egg white to yolk ratio, and thus a desired cholesterol level per serving.

During the next pan advancing cycle, the pan 28 passes beneath the whole egg dispensing tube 104. When a signal is received from the third pan sensor 186 indicating that the pan is present beneath the dispensing tube 104 and the index sensor 198 sends a signal indicating that another pusher element 154 is adjacent thereto, the conveyor motor 150 is once again stopped and a signal is sent to the valve control system 212 to cause the pneumatically actuated rotary coupling 106 to pivot the dispensing tube 104 downward so that whole eggs will flow gently into the pan 28 on top of the egg white already contained therein. Once a predetermined weight of whole eggs has been dispensed into the pan 28, as sensed by the signal sent from the weigh scale 202, the control unit 196 causes the valve control system 212 to raise the dispensing tube 104 and terminate the filling of the pan 28. The loaded pan 28 is then ready to be conveyed into the cooking tunnel 47 as described above in conjunction with FIG. 1.

In the alternative mode of operation where the eggs are mixed to form scrambled eggs, the egg breaker 18 is set to direct the eggs down the chute 24 to the mixer 42, and then to the egg white/scrambled egg tank 38, where the eggs are optionally mixed with a predetermined quantity of additional egg white to lower their cholesterol content. The operation of the pan filling system is as before, however, the control unit 196 does not send any signals to the pneumatic valve control system 212 to cause actuation of the valve 106 for the whole egg dispensing tube 104. Instead, the pans 28 are loaded entirely from the egg white dispensing tube 172, which in this mode of operation dispenses mixed whole eggs.

Figure 4A:
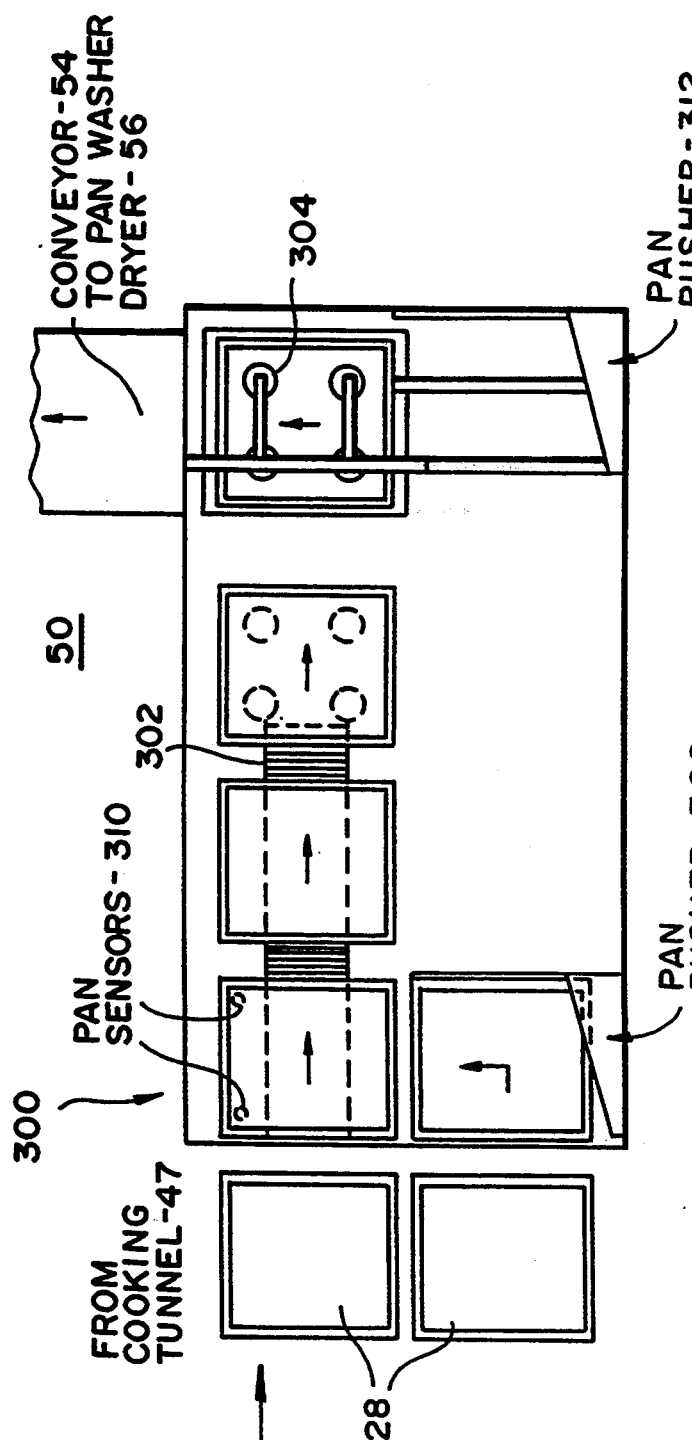
Figure 4B:
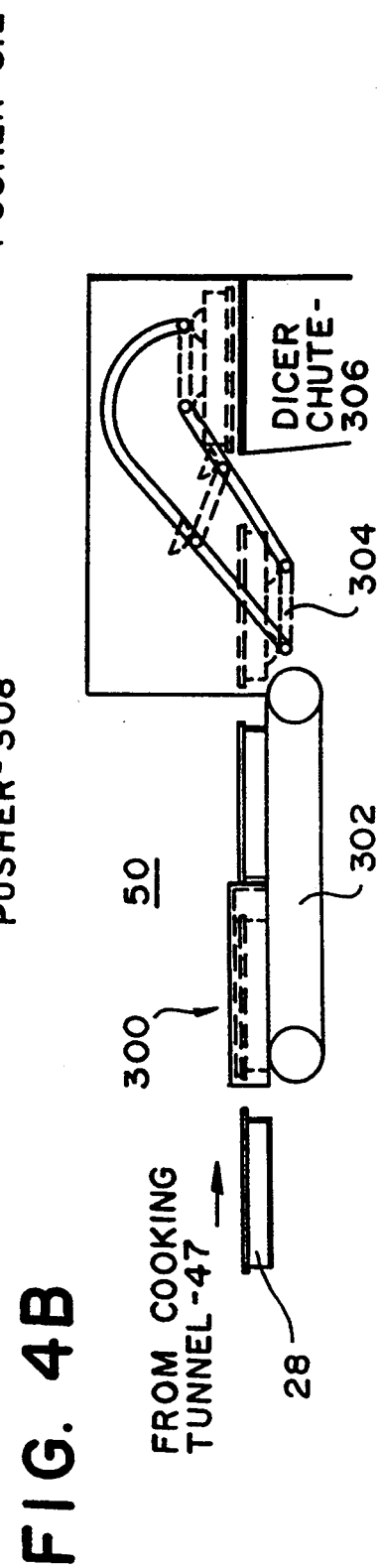

Turning now to FIGS. 4A and 4B, the pan flipper 50 is illustrated in greater detail and includes a feed end 300 for receiving the loaded pans 28 as they are discharged from the cooking tunnel 47. A belt type conveyor section 302 is disposed along the left side of the feed end 300, and is actuated intermittently to index the pans 28 toward a vacuum gripper element 304 which engages the bottom side of each of the pans, and flips the pans over to empty their contents into a dicer chute 306 for the egg dicer 52. A first pan pusher element 308 is employed to push each of the pans 28 that enter the right side of the feed end 300 to the left and onto the conveyor section 302. A pair of pan sensors 310 are provided to sense when a pan is present at the left side of the feed end 300. A control (not shown) insures that the pan pusher 308 will not be actuated when a pan is already being sensed by the pan sensors 310. A second pan pusher element 312 is employed to push the emptied pans onto the conveyor section 54 to be transferred to the pan washer/dryer 56 as illustrated in FIG. 1.

In summary, this egg cooking process has numerous advantages over prior art egg cooking techniques. Since the eggs are broken before they are cooked, the time consuming step of removing egg shells from hard cooked eggs is eliminated, and the quantity of eggs which can be cooked and packaged in a given time period is correspondingly increased. The pan filling station 22 is a key element that enables the process to be carried out in this manner and provides an egg transfer system which keeps the egg whites and yolks intact and together as if they had not been removed from their shells. By depositing additional egg white into the cooking pans before the eggs are received therein, an additional cushion is provided to further insure that the yolks are not broken, and eggs with lower cholesterol per serving are obtained.

The multiple temperature zone cooking process employs dry culinary steam to provide a cooking environment that is neither too wet, nor too dry. This, combined with the multiple temperature zones, results in a cooked product of superior quality. Additionally, the high temperature employed at the end of the cooking process insures that the cooked eggs will be hot enough as they enter the packagers to sterilize the packaging material. Sealing the cooked eggs in their packages while they are still hot also seals in the flavor and results in the formation of a partial vacuum as the packages are cooled to a refrigeration temperature which further extends the shelf life of the packaged eggs.

Although the invention has been disclosed in terms of a preferred embodiment, it will be understood that additional variations and modifications could be made thereto without departing from the true spirit and scope thereof as defined by the following claims.

I claim:

1. Apparatus for cooking and packaging eggs comprising:
    a) means to dispense a predetermined quantity of deshelled eggs into each of a plurality of cooking pans;
    b) a multiple temperature zone cooking means for cooking the eggs including at least a first zone set to a first temperature and a second zone set to a second higher temperature;
    c) means to convey the loaded cooking pans through said multiple temperature zone cooking means;
    d) a packager for packaging and sealing the cooked eggs;
    means to transfer the cooked eggs to said packager;
    f) cooling means for cooling the packaged and sealed eggs to a refrigerated temperature of approximately 40° F.; and,
    g) means for transferring the packaged and sealed eggs from said packager to said cooling means.

2. The apparatus of claim 1, wherein said means to dispense further comprises:
    i) egg breaker means to break and remove the shells from a plurality of fresh eggs to form a plurality of deshelled intact whole eggs;
    ii) valve means to dispense said deshelled intact whole eggs into said cooking pans without breaking the yolks of said deshelled intact whole eggs; and,
    iii) means to transfer said deshelled whole intact eggs from said breaker means to said valve means.

3. The apparatus of claim 2, further comprising means to dispense a predetermined quantity of additional egg white into said cooking pans before said deshelled intact whole eggs are dispensed therein to act as a cushion for said eggs as they are received in said pans.

4. The apparatus of claim 1, wherein said means to dispense further comprises:
    i) egg breaker means to break and remove the shells from a plurality of fresh eggs to form a plurality of deshelled eggs;
    ii) mixer means to mix the deshelled eggs into mixed eggs;
    iii) means to transfer said deshelled eggs from said breaker means to said mixer means;
    iv) valve means to dispensed said mixed eggs into said cooking pans; and,
    v) means to transfer said mixed eggs from said mixer means to said valve means.

5. The apparatus of claim 4, further comprising means to add a predetermined quantity of additional egg white to said mixed eggs.

6. The apparatus of claim 1, further comprising means to supply dry culinary steam to said cooking means to cook the eggs.

7. The apparatus of claim 1, wherein said means to transfer further comprises a dicing means for chopping the cooked eggs before they are transferred to said packager.

8. The apparatus of claim 1, wherein said cooling means comprises:
    i) a cooling tunnel;
    ii) means to convey the packaged and sealed eggs through the cooling tunnel; and,
    iii) means to spray ice water on the packaged and sealed eggs as they are conveyed through the cooling tunnel.

9. The apparatus of claim 8, further comprising means to blow dry the packaged and sealed eggs after they are conveyed through the cooling tunnel.

10. Apparatus for cooking and packaging eggs comprising:
    a) means to dispense a predetermined quantity of deshelled eggs into each of a plurality of cooking pans;
    b) a multiple temperature zone cooking means for cooking the eggs including at least a first zone set to a first temperature and a second zone set to a second higher temperature;

c) means to supply dry culinary steam to said cooking means to cook said eggs;

d) means to convey the loaded cooking pans through said multiple temperature zone cooking means;

e) a packager for packaging and sealing the cooked eggs;

f) means to transfer the cooked eggs to said packager;

g) cooling means to cool the packaged and sealed eggs to a refrigerated temperature of approximately 40° F.; and, h) means to transfer the packaged and sealed eggs from said packager to said cooling means.

11. The apparatus of claim 10, wherein said means to dispense further comprises:

i) egg breaker means to break and remove the shells from a plurality of fresh eggs to form a plurality of deshelled intact whole eggs;

ii) valve means to dispense said deshelled intact whole eggs into said cooking pans without breaking the yolks of said deshelled intact whole eggs; and, iii) means to transfer said deshelled whole intact eggs from said breaker means to said valve means.

12. The apparatus of claim 11, further comprising means to dispense a predetermined quantity of additional egg white into said cooking pans before said deshelled intact whole eggs are dispensed therein to act as a cushion for said eggs as they are received in said pans.

13. The apparatus of claim 10, wherein said means to dispense further comprises:

i) egg breaker means to break and remove the shells from a plurality of fresh eggs to form a plurality of deshelled eggs;

ii) mixer means to mix the deshelled eggs into mixed eggs;

iii) means to transfer said deshelled eggs from said breaker means to said mixer means;

iv) valve means to dispense said mixed eggs into said cooking pans; and, v) means to transfer said mixed eggs from said mixer means to said valve means.

14. The apparatus of claim 13, further comprising means to add a predetermined quantity of additional egg white to said mixed eggs.

15. The apparatus of claim 10, wherein said means to transfer further comprises a dicing means for chopping the cooked eggs before they are transferred to said packager.

16. The apparatus of claim 10, wherein said cooling means comprises:

i) a cooling tunnel;

ii) means to convey the packaged and sealed eggs through the cooling tunnel; and, iii) means to spray ice water on the packaged and sealed eggs as they are conveyed through the cooling tunnel.

17. The apparatus of claim 16, further comprising means to blow dry the packaged and sealed eggs after they are conveyed through the cooling tunnel.

* * * * *